United States Patent [19]
De Leu

[11] Patent Number: 6,000,353
[45] Date of Patent: Dec. 14, 1999

[54] SOLAR POWERED RAFT WITH GUIDANCE SYSTEM

[76] Inventor: Douglas F. De Leu, P.O. Box 9346, Michigan City, Ind. 46361

[21] Appl. No.: 09/087,961

[22] Filed: Jun. 1, 1998

Related U.S. Application Data

[60] Provisional application No. 60/048,439, Jun. 2, 1997.

[51] Int. Cl.[6] ....................................... B63B 1/16
[52] U.S. Cl. ..................... 114/61.1; 114/61.24; 440/6; 440/63
[58] Field of Search ............................. 441/35, 130–132; 440/6, 63; 114/61.1, 61.22, 61.24

[56] References Cited

U.S. PATENT DOCUMENTS

| | | | |
|---|---|---|---|
| 1,825,240 | 9/1931 | Miller | 440/63 |
| 3,139,058 | 6/1964 | Robinson . | |
| 3,812,805 | 5/1974 | Forssell et al. . | |
| 4,303,033 | 12/1981 | King | 440/6 |
| 4,311,108 | 1/1982 | Horton | 441/130 |
| 4,480,569 | 11/1984 | Trefethern et al. . | |
| 4,730,571 | 3/1988 | Hedlund et al. | 440/6 |
| 5,074,811 | 12/1991 | Crisman | 440/6 |
| 5,236,378 | 8/1993 | Newmen . | |
| 5,289,999 | 3/1994 | Naujeck et al. . | |
| 5,403,220 | 4/1995 | Goad, Sr. . | |
| 5,413,066 | 5/1995 | Spencer, Jr. et al. . | |
| 5,529,008 | 6/1996 | Craig . | |

FOREIGN PATENT DOCUMENTS

| | | | |
|---|---|---|---|
| 2 484 356 | 12/1981 | France . | |
| 1182979 | 12/1962 | Germany . | |
| 3528270 | 4/1986 | Germany . | |
| 3528870 | 4/1986 | Germany . | |
| 41 05 318 | 8/1992 | Germany | 440/6 |
| 637 584 | 8/1983 | Switzerland . | |

*Primary Examiner*—Sherman Basinger
*Attorney, Agent, or Firm*—Richard C. Litman

[57] ABSTRACT

A pontoon raft having a hand controlled steering mechanism and solar cells for powering an outboard electric motor. The raft has an adjustable lounge chair located between the pontoons, for supporting an occupant in a seated or reclined position.

7 Claims, 2 Drawing Sheets

SOLAR POWERED RAFT WITH GUIDANCE SYSTEM

CROSS-REFERENCE TO RELATED APPLICATION

This application claims the benefit of U.S. Provisional Patent Application Serial No. 60/048,439, filed Jun. 2, 1997.

BACKGROUND OF THE INVENTION

1. Field of the Invention

The present invention relates to small watercraft and, more particularly, to a solar powered chair float of the pontoon type.

2. Description of the Related Art

It is well known to mount a reclining chair between a pair of parallel elongated floats. Most common among these floats are those used to float freely in a pool or to move with the aid of manual locomotion, such as use of the hands or hand-held paddles. Other floats with pontoons that are used for larger bodies of water include those that move with the aid of manual locomotion, such as the use of a foot rotated paddle or propeller. Such small watercraft have also included the use of electric and internal combustion powered marine propulsion equipment.

U.S. Pat. No. 5,413,066, issued to William R. Spenser, Jr. et al., on May 9, 1995, shows a manual propulsion mechanism removably mounted to a frame supported by a pair of inflatable pontoons. An inflatable pontoon boat with a wooden transom that can be used for either mounting a small outboard engine or a rudder is disclosed by U.S. Pat. No. 3,812,805, issued to Dag C. G. Forssel et al., on May 28, 1974. A catamaran type watercraft with two floats and a platform overlying them carrying an upright power unit for propulsion of the watercraft is disclosed by U.S. Pat. No. 5,529,008, issued to Robert W. Craig on Jun. 25, 1996. U.S. Pat. No. 5,403,220, issued to Christopher F. Goad on Apr. 4, 1995, discloses a jet-propelled chair float that utilizes a pair of electric sump pumps powered by a battery as propulsion means. A propelled pontoon chair with hand operated controls for controlling the propulsion speed and rudder linkage is shown by U.S. Pat. No. 4,480,568, issued to George M. Trefethern et al., on Nov. 6, 1984. U.S. Pat. No. 3,139,058, shows a powered watercraft with a hull consisting of separate portions which may be operated in a divided position as a multiple hull watercraft or may be joined together into one unit as a single hull watercraft.

None of the prior art watercraft include solar photovoltaic cells to charge batteries that are used to power an electric motor, nor do they provide wiring shielded from water. None of the prior art watercraft use a guidance system having a control stick and linkage of the type according to the present invention.

None of the above inventions and patents, taken either singly or in combination, is seen to describe the instant invention as claimed.

SUMMARY OF THE INVENTION

The watercraft of the instant invention is constructed and operates as follows. A pair of pontoons are interconnected to each other by the seat of a chair having an adjustable back to form a raft. Each pontoon has a flat upwardly facing surface which is used as an arm rest. One pontoon has a control panel raising from the flat surface. The control panel carries a plurality of switches including, but not limited to, those required to control the recharging of the battery via the solar photovoltaic cell, and operation of an electric motor. Either pontoon may carry the control panel, and thus the craft may be constructed to accommodate both right-handed and left-handed operators. Both pontoons have solar photovoltaic cells located upon the flat, upper surface thereof. The solar photovoltaic cells are connected to a battery which is itself connected to the control panel. The battery, located within one of the pontoons, is recharged by the solar photovoltaic cells as the battery's charge is depleted. An electric motor with a propeller at the end of a vertical shaft is positioned rearward of the chair and supported by a tube attached between the pontoons. The tube has a neck vertically disposed at the tubes midpoint that pivotally receives the vertical shaft of the electric motor. Conductive wiring for interconnecting the control panel, the electric motor, the battery, and the solar photovoltaic cells are carried within the tube and the pontoons. The tube and the pontoons shield the wiring from water.

The solar photovoltaic cells may be connected directly to the control panel without the inclusion of a battery. Power would be delivered directly to the electric motor from the solar photovoltaic cells.

The speed of the raft is controlled by a variable rheostat switch mounted upon the control panel, the switch being any analog or digital variable voltage or current control device. The course of the raft is controlled by moving a control stick adjacent the control panel. The propulsion created by the propeller which is turned by the motor is used to change the course of the raft, for example, to the right by moving the control stick to the right. Moving the control stick to the right moves the front of the motor, via linkage, to the left as it pivots within the tube thus moving the orientation of the propeller to the right.

Accordingly, it is a principal object of the invention to provide a solar powered raft with an improved guidance system that is adaptable to right-handed or left handed operation.

It is another object of the invention to provide a solar powered raft with pontoons having a substantially flat upper surface for use as an arm rest and for carrying solar photovoltaic cells.

It is a further object of the invention to provide a solar powered raft with wiring shielded from water within the pontoons and the motor support.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
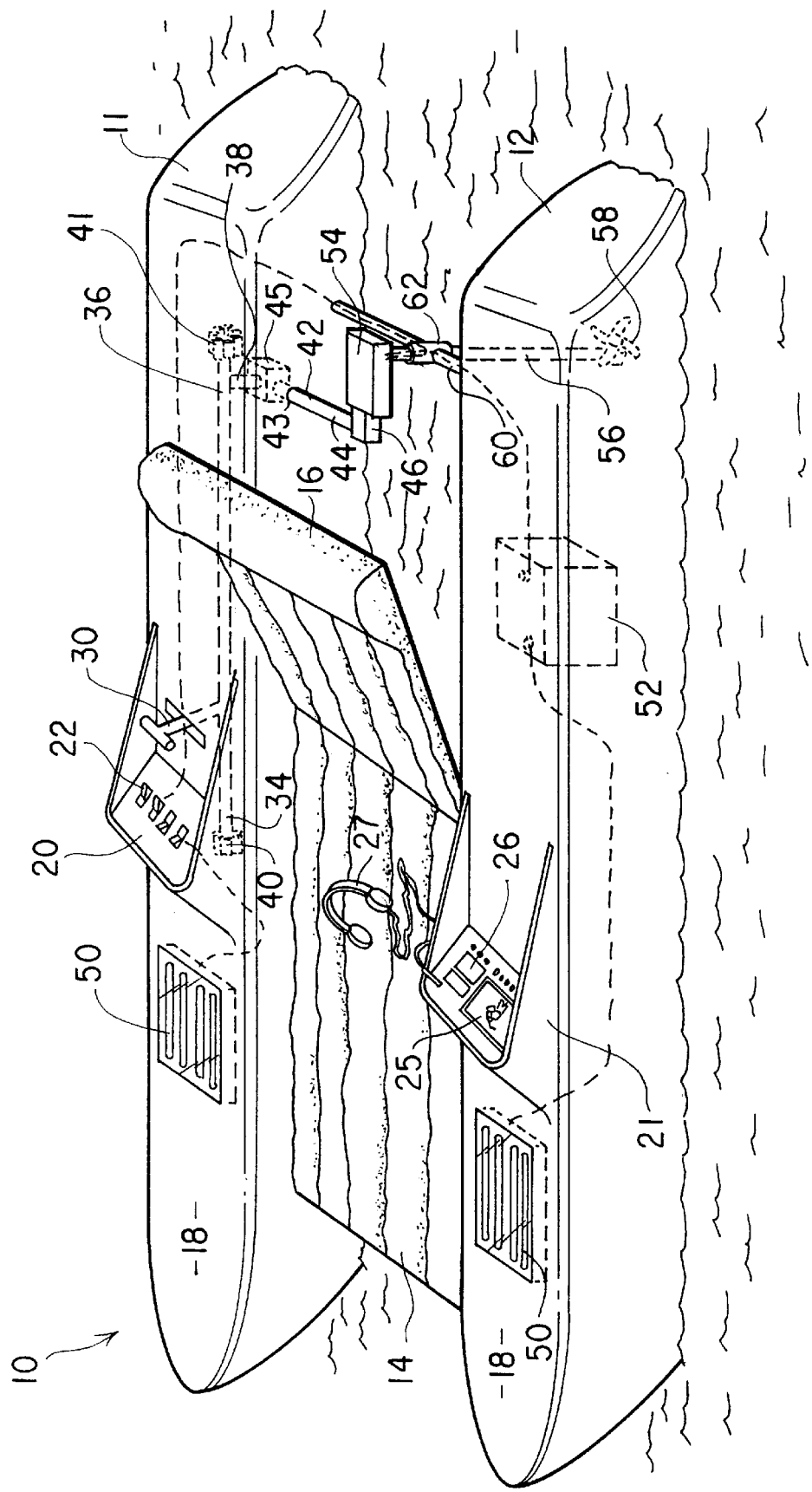
FIG. 1 an environmental, perspective view of a raft with guidance system according to the present invention.
Figure 2:
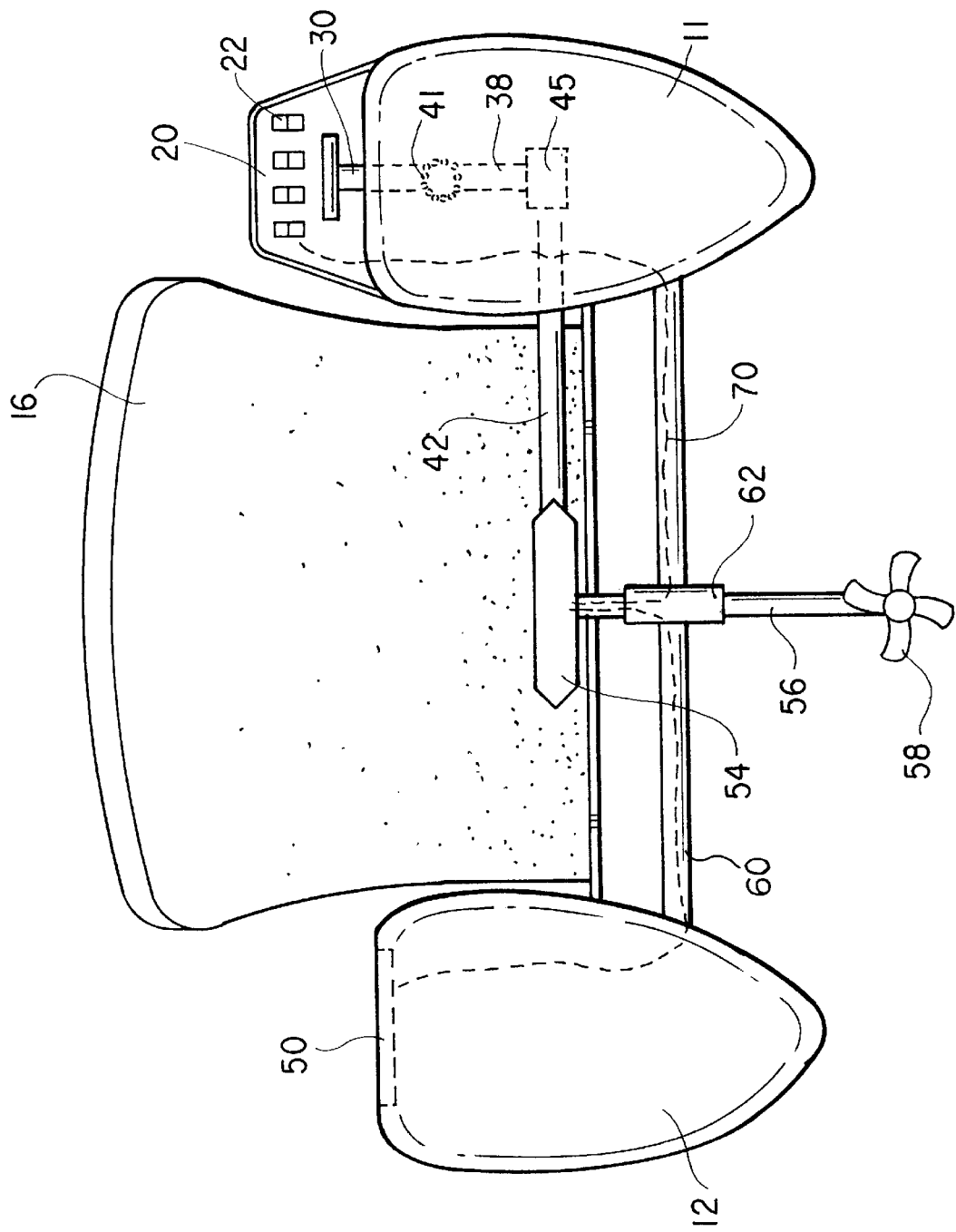
FIG. 2 a rear elevation view of a raft with guidance system according to the present invention.

Referring to FIGS. 1 and 2, a pair of pontoons 11, 12 are interconnected to each other by the seat 14 of a chair having an adjustable back 16. Each pontoon 11, 12 has a flat upwardly facing surface 18, a portion of which is for use as an arm rest. One pontoon 11 has a control panel 20 raising from the flat surface 18, a control stick 30 with linkage, and a solar photovoltaic cell 50 located thereupon. The control panel 20 carries a plurality of switches 22 including but not limited to those required to control the recharging of the battery 52 via the solar photovoltaic cells 50 and operation of an electric motor 54. The other pontoon 12 has an entertainment panel 21 raising from the flat surface 18 a solar photovoltaic cell 50 located upon the flat surface 18 and a battery 52 within. The entertainment panel 21 carries a small screen, high definition television 25 and an AM/FM radio 26. A headset and jack 27 is provide for use in listening to either radio or television broadcasts. Locating the battery 52 in one pontoon 12 and the linkage within the other pontoon 11 allows for greater equality of weight distribution. Nevertheless, a plurality of batteries 52 may be carried in either pontoon 11, 12.

Referring to FIG. 2, the solar photovoltaic cells 50 may be connected directly to the control panel 20 without the inclusion of a battery 52. Power would be delivered directly to the electric motor 54 from the solar photovoltaic cells 50. In addition, the entertainment panel 21 (not shown in FIG. 2) can be foregone in favor of additional solar photovoltaic cells.

Referring to FIGS. 1 and 2, the solar photovoltaic cells 50 are connected to the battery 52 which is itself connected to the control panel 20. The battery 52 is recharged by the solar photovoltaic cells 50 as the batteries charge is depleted. An electric motor 54 with a propeller 58 at the end of a vertical shaft 56 is positioned rearward of the chair and supported by a tube 60 attached between the pontoons 11, 12. The tube 60 has a neck 62 vertically disposed at the tube's midpoint that pivotally receives the vertical shaft 56 of the electric motor 54. The wiring 70 used to connect the solar photovoltaic cells 18, the battery 52, the control panel 22, and motor 54 is shielded from water 72 within the pontoons 11,12 and within the motor support tube 60.

The course of the raft 10 is controlled by moving a control stick 30 adjacent to the control panel 20. A shaft 32 having a first end 34 and a second end 36 is rotatably supported at the first end 34 by a roller bearing 40 and at the second end 36 by another roller bearing 41. The control stick 30 projects upward from the shaft 32 near the first end 34 thereof. The control stick 30 is frictionally lockable upon the pontoon 11 for releasably securing the position of the control stick 30. A second rod 38 projects downward from the shaft 32 near the second end 36 of the shaft 32. Both the control stick 30 and the rod 38 lie in the same plane. A trace 42 having a first end 43 and second end 44 has its first end 43 connected, using a universal joint 45, to the rod 38 and the second end 44, connected using another universal joint 46, to the front of the electric motor 59.

The propulsion generated by the electric motor 54 with the propeller 58 at the end of a vertical shaft 56 is used to change the course of the raft 10, for example, to the right by moving the control stick 30 to the right. Moving control stick 30 to the right moves the rod 38 via the shaft 32 to the left, the trace 42 attached to the rod 38 moves to the left thereby moving the front of the motor 54 to the left as it pivots within the neck 62, thus moving the orientation of the propeller 58 to the right.

It is to be understood that the present invention is not limited to the sole embodiment described above, but encompasses any and all embodiments within the scope of the following claims.

I claim:
1. A solar powered raft comprising;
   a pair of pontoons interconnected in fixed spaced relationship to each other, each of said pontoons having a substantially flat upwardly facing surface adapted for use as arm rest, at least one of said pontoons having a control panel mounted upon said substantially flat surface of said at least one of said pontoons, and carrying at least one solar photovoltaic cell;
   a chair suspended between said pontoons and having a seat and an adjustable back, said seat being maintained in substantial horizontal alignment therewith;
   propulsion means positioned rearwardly of said chair and between said pontoons, for propelling the raft across and atop a body of water;
   first control means upon said control panel and interconnected with said propulsion means and said solar photovoltaic cell for controlling the speed of the raft; and
   second control means adjacent said control panel for controlling the course of the raft, and comprising;
      a shaft having a first end and a second end, there further being a first bearing at said first end and a second bearing at said second end, said bearings rotatably supporting said shaft;
      a control stick for manually controlling said shaft by rotation thereof, said control stick projecting upwardly from said shaft proximate said first end of said shaft and perpendicularly thereto, said control stick frictionally lockable upon said pontoon for releasably securing the position thereof;
      a rod projecting downwardly from said shaft proximate said second end of said shaft and lying in the same plane as said control stick; and
      a trace having a first end, a second end, a first universal joint and a second universal joint, said first end connected using said first universal joint to said rod and said second end connected using said second universal joint to said propulsion means for transmitting motion from said rod to said propulsion means.

2. The raft according to claim 1, wherein said propulsion means comprise an electric motor, a vertical drive shaft and a propeller, said motor being in driving engagement with said propeller via said vertical shaft.

3. The raft according to claim 2, there being means interconnecting said electric motor with said photovoltaic cell so that said electric motor is powered by said at least one solar photovoltaic cell.

4. The raft according to claim 3, including at least one battery located within one of said pontoons, for delivering power to said electric motor.

5. The raft according to claim 4, there further being means for allowing said battery to be recharged by said solar photovoltaic cell.

6. The raft according to claim 5, including conductive wiring for interconnecting said solar photovoltaic cell, said battery, said first control means, and said electric motor, said wiring being located within at least one of said pontoons whereby said pontoon shields said wiring from water.

7. The raft according to claim 1, further comprising a tube attached between said pontoons and being disposed perpendicularly thereto, whereby said propulsion means is supported by said tube, said tube being adapted to receive said vertical shaft of said propulsion means.

* * * * *